(12) United States Patent
Geisert et al.

(10) Patent No.: US 12,315,363 B2
(45) Date of Patent: May 27, 2025

(54) DIRECTIONAL WARNINGS IN CO-LOCATED PLAY IN VIRTUAL REALITY ENVIRONMENTS

(71) Applicant: Meta Platforms Technologies, LLC, Menlo Park, CA (US)

(72) Inventors: David Frederick Geisert, Redwood City, CA (US); Eugene Lee, Mountain View, CA (US); Shir Lene Lim, Kirkland, WA (US); Brittany Baxter, Renton, WA (US); Jeng-Weei Lin, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 73 days.

(21) Appl. No.: 18/064,159

(22) Filed: Dec. 9, 2022

(65) Prior Publication Data
US 2024/0194040 A1    Jun. 13, 2024

(51) Int. Cl.
G08B 7/06 (2006.01)
G06F 3/01 (2006.01)
G06F 3/16 (2006.01)

(52) U.S. Cl.
CPC ................ *G08B 7/06* (2013.01); *G06F 3/011* (2013.01); *G06F 3/016* (2013.01); *G06F 3/167* (2013.01)

(58) Field of Classification Search
CPC . G08B 7/06; G06F 3/011; G06F 3/016; G06F 3/167
See application file for complete search history.

(56) References Cited

U.S. PATENT DOCUMENTS

| 9,266,019 | B2 | 2/2016 | Kim |
| 9,384,594 | B2 | 7/2016 | Maciocci et al. |
| 9,729,864 | B2 | 8/2017 | Stafford |
| 9,760,790 | B2 | 9/2017 | Novak |
| 9,939,635 | B2 | 4/2018 | Thomas et al. |
| 10,002,429 | B2 | 6/2018 | Yoon et al. |

(Continued)

FOREIGN PATENT DOCUMENTS

CN    109671118 A    4/2019

OTHER PUBLICATIONS

International Search Report and Written Opinion for International Application No. PCT/US2023/013223, mailed May 22, 2023, 12 pages.

(Continued)

*Primary Examiner* — An T Nguyen
(74) *Attorney, Agent, or Firm* — Potomac Law Group, PLLC; Dannon G. Allbee

(57) ABSTRACT

In one embodiment, a method includes rendering, for one or more displays of a VR display device, a first output image of a VR environment based on a field of view of a first user. The method includes determining whether a second user is approaching within a threshold distance of the first user and outside the field of view of the first user. The method includes rendering, responsive to determining the second user is approaching within the threshold distance of the first user and outside the field of view of the first user, for the one or more displays of the VR display device, a second output image comprising a directional warning. The directional warning may indicate a direction of movement of the second user relative to the first user.

20 Claims, 12 Drawing Sheets

(56) References Cited

U.S. PATENT DOCUMENTS

| | | | |
|---|---|---|---|
| 10,127,731 B1* | 11/2018 | Ozery | G08B 25/08 |
| 10,338,392 B2 | 7/2019 | Kohler et al. | |
| 10,503,996 B2 | 12/2019 | Novak | |
| 10,617,956 B2 | 4/2020 | Black et al. | |
| 10,627,635 B2 | 4/2020 | Kiemele et al. | |
| 10,691,945 B2 | 6/2020 | Bostick et al. | |
| 10,773,169 B2 | 9/2020 | Leeper et al. | |
| 10,812,422 B2* | 10/2020 | Mullins | H04L 51/222 |
| 10,818,089 B2 | 10/2020 | Gough et al. | |
| 10,928,887 B2 | 2/2021 | Bostick et al. | |
| 10,974,132 B2 | 4/2021 | Drake et al. | |
| 10,976,804 B1 | 4/2021 | Atlas et al. | |
| 11,009,716 B2 | 5/2021 | Kiemele et al. | |
| 11,144,759 B1 | 10/2021 | Hatfield et al. | |
| 11,232,644 B1 | 1/2022 | Lee | |
| 11,410,360 B2 | 8/2022 | Ruth et al. | |
| 11,410,395 B2 | 8/2022 | Velasquez et al. | |
| 11,468,604 B2 | 10/2022 | Jagnow et al. | |
| 11,551,430 B2 | 1/2023 | Velasquez et al. | |
| 11,568,605 B2 | 1/2023 | Shahrokni et al. | |
| 11,580,711 B2 | 2/2023 | Berliner et al. | |
| 2010/0169796 A1* | 7/2010 | Lynk | H04L 67/131 715/757 |
| 2013/0293586 A1 | 11/2013 | Kaino et al. | |
| 2015/0024368 A1 | 1/2015 | King, Jr. | |
| 2016/0057726 A1 | 2/2016 | Bai et al. | |
| 2016/0093108 A1 | 3/2016 | Mao et al. | |
| 2016/0335808 A1 | 11/2016 | Novak | |
| 2016/0350973 A1 | 12/2016 | Shapira et al. | |
| 2017/0262045 A1 | 9/2017 | Rouvinez et al. | |
| 2017/0287215 A1 | 10/2017 | Lalonde et al. | |
| 2017/0358141 A1 | 12/2017 | Stafford et al. | |
| 2017/0372499 A1 | 12/2017 | Lalonde | |
| 2018/0004481 A1 | 1/2018 | Fallon | |
| 2018/0020312 A1 | 1/2018 | Visser et al. | |
| 2018/0034867 A1 | 2/2018 | Zahn et al. | |
| 2018/0276891 A1 | 9/2018 | Craner | |
| 2018/0321894 A1 | 11/2018 | Paulovich et al. | |
| 2018/0374276 A1 | 12/2018 | Powers et al. | |
| 2019/0011978 A1* | 1/2019 | Ravindran | G06T 19/006 |
| 2019/0041651 A1 | 2/2019 | Kiemele et al. | |
| 2019/0073829 A1 | 3/2019 | Holz et al. | |
| 2019/0172262 A1 | 6/2019 | McHugh et al. | |
| 2019/0188895 A1 | 6/2019 | Miller, IV et al. | |
| 2019/0204599 A1* | 7/2019 | Abbott | G06T 19/006 |
| 2019/0227312 A1* | 7/2019 | Lai | G06F 3/011 |
| 2019/0320138 A1* | 10/2019 | Kaufthal | G06V 40/168 |
| 2019/0329136 A1* | 10/2019 | Koyama | A63F 13/55 |
| 2019/0378280 A1* | 12/2019 | Cho | G06F 3/011 |
| 2020/0035030 A1 | 1/2020 | Schradin et al. | |
| 2020/0103521 A1 | 4/2020 | Chiarella et al. | |
| 2020/0167003 A1 | 5/2020 | Nonomura et al. | |
| 2020/0225495 A1 | 7/2020 | Kiemele et al. | |
| 2020/0234559 A1 | 7/2020 | Chen et al. | |
| 2020/0342673 A1* | 10/2020 | Lohr | G06F 3/011 |
| 2020/0359158 A1 | 11/2020 | Brimijoin, II et al. | |
| 2020/0394012 A1 | 12/2020 | Wright, Jr. et al. | |
| 2020/0394807 A1 | 12/2020 | Horesh et al. | |
| 2021/0055367 A1 | 2/2021 | Poore et al. | |
| 2021/0081031 A1 | 3/2021 | Perlin et al. | |
| 2021/0092081 A1* | 3/2021 | Mullins | G06T 19/006 |
| 2021/0287382 A1 | 9/2021 | Lehrich et al. | |
| 2021/0312887 A1 | 10/2021 | Griswold et al. | |
| 2022/0075591 A1 | 3/2022 | Cardenas Gasca et al. | |
| 2023/0010105 A1 | 1/2023 | Ha et al. | |
| 2023/0051775 A1 | 2/2023 | Hamadou | |
| 2023/0080905 A1* | 3/2023 | Tomczek | G06F 3/016 345/156 |
| 2023/0081452 A1* | 3/2023 | Ellappan | G06F 3/011 342/61 |

OTHER PUBLICATIONS

Co-pending U.S. Appl. No. 17/673,682, inventors Geisert; David Frederick et al., filed on Feb. 16, 2022.

Lacoche J., et al., "Collaborators Awareness for User Cohabitation in Co-Located Collaborative Virtual Environments," 23rd ACM Symposium on Virtual Reality Software and Technology(VRST), Nov. 8, 2017, No. 15, 9 pages.

Scavarelli A., et al., "VR Collide! Comparing Collision-Avoidance Methods between Co-Located Virtual Reality Users," Conference Extended Abstracts on Human Factors in Computing Systems, May 6, 2017, pp. 2915-2921.

European Search Report for European Patent Application No. 24157372.4, dated Jun. 4, 2024, 3 pages.

European Search Report for European Patent Application No. 24167263.3, dated Aug. 27, 2024, 7 pages.

* cited by examiner

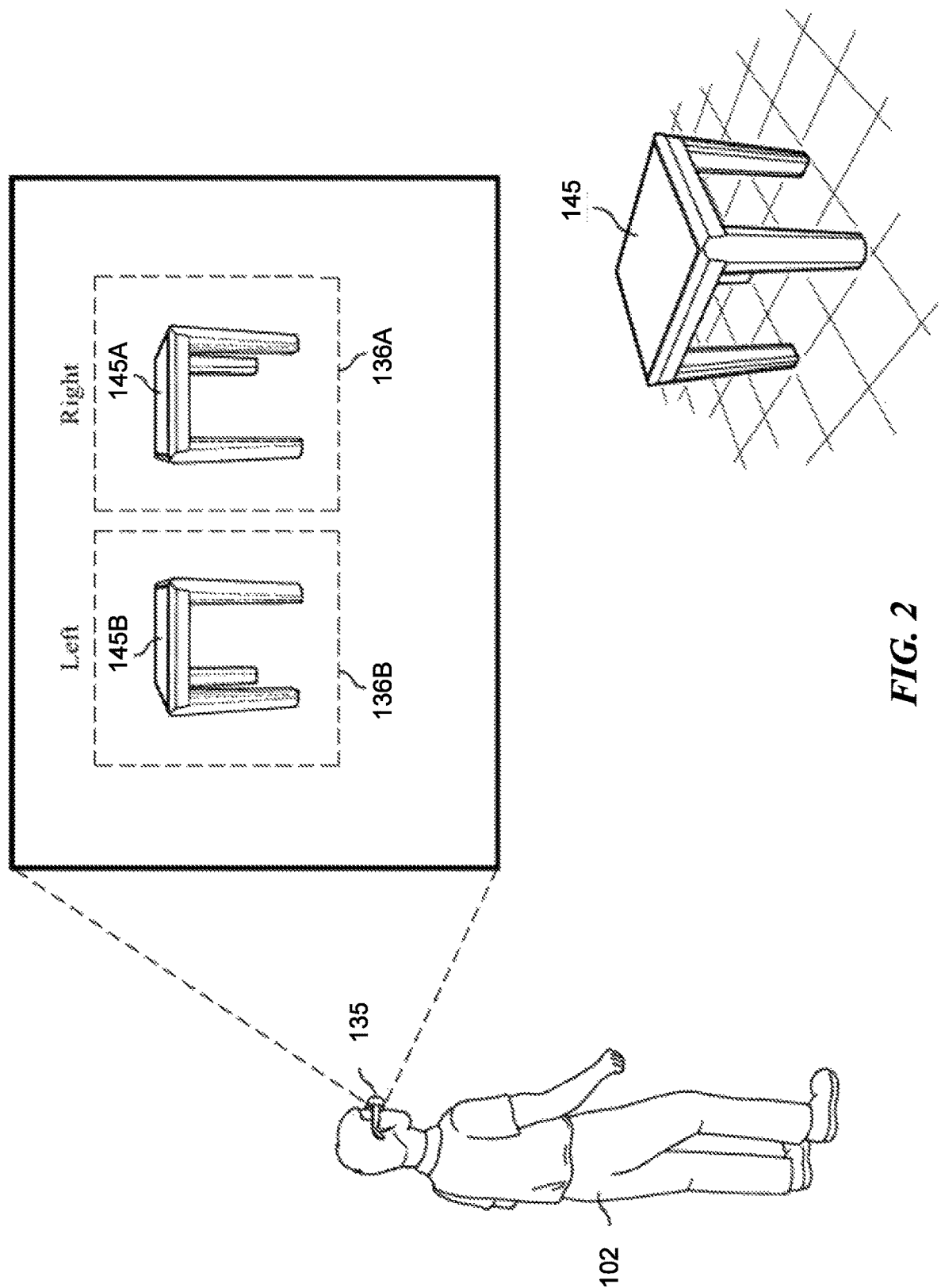

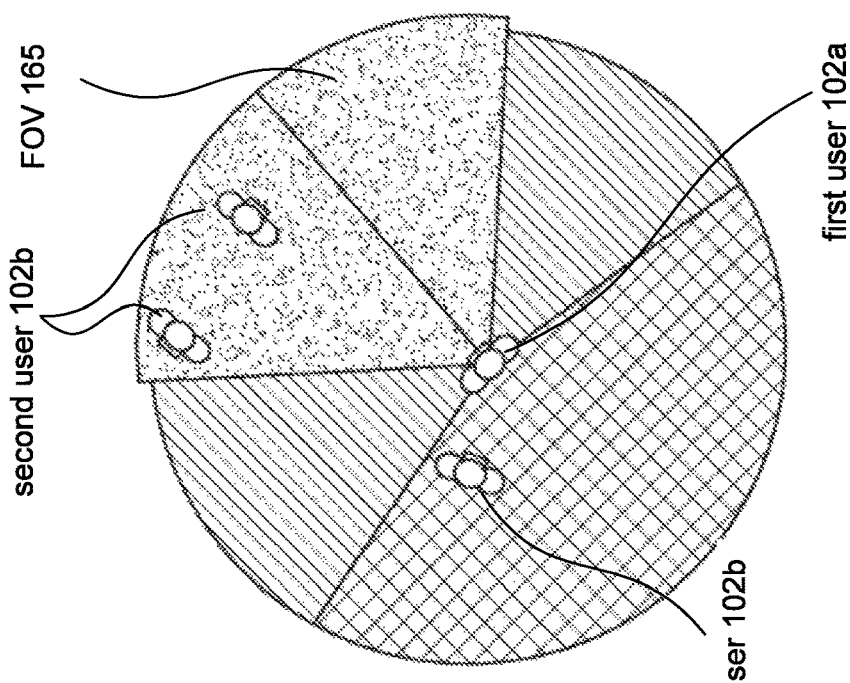
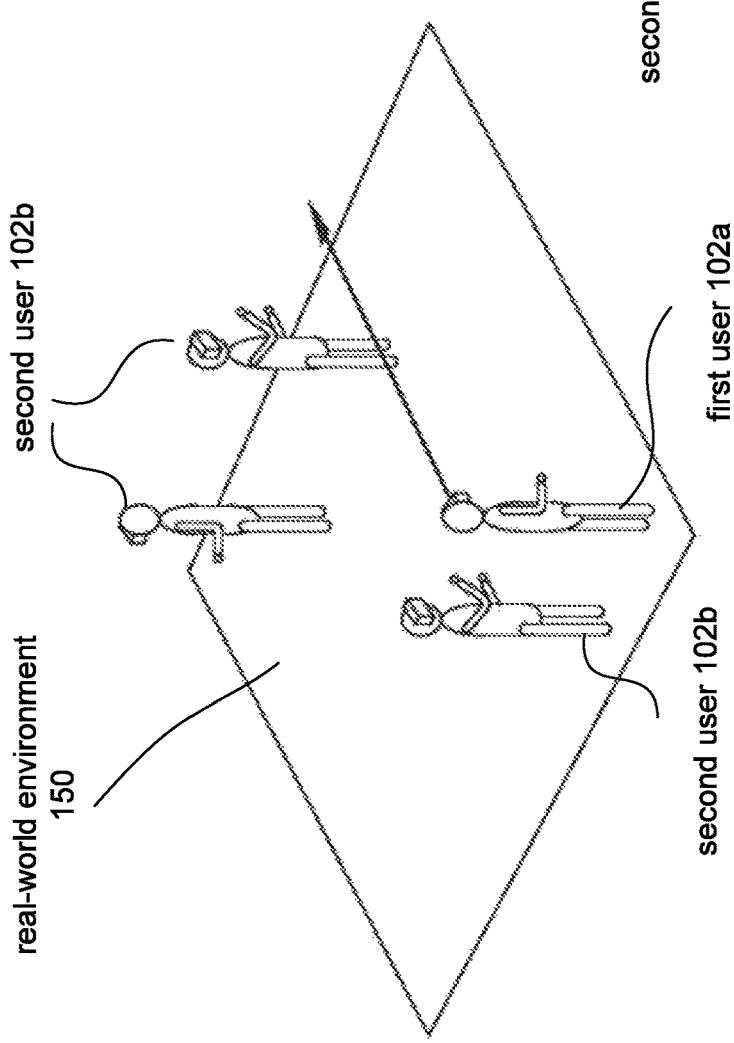
FIG. 3B
FIG. 3A

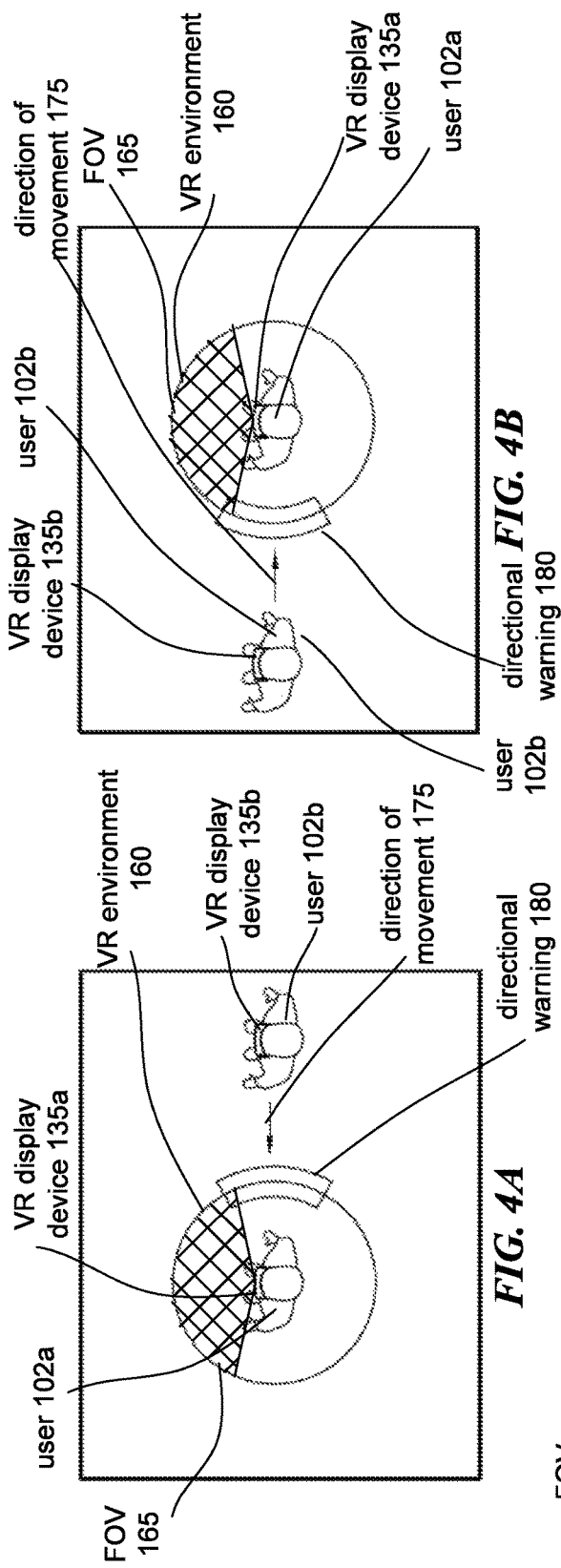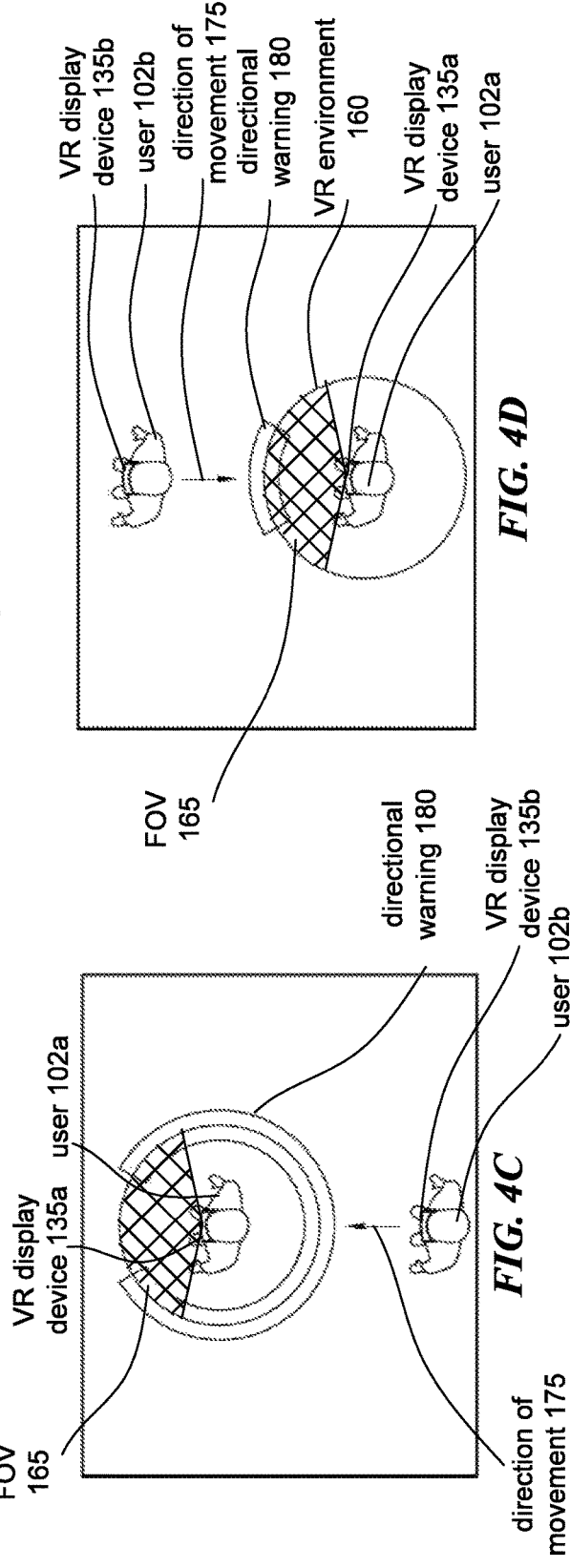

DIRECTIONAL WARNINGS IN CO-LOCATED PLAY IN VIRTUAL REALITY ENVIRONMENTS

TECHNICAL FIELD

This disclosure generally relates to databases and file management within network environments, and in particular relates to determining spatial awareness in a virtual reality (VR) setting.

BACKGROUND

Traditional methods of spatial awareness for two or more users in VR settings within a shared real-world space involve providing a field of view of a VR environment that is generally narrower than the users' field of view in real-world environments. Users may have a poor mental model of their spatial limitations based on this narrower field of view as they may draw from the experience of an expected field of view from the real-world environment. As such, it may be difficult to ensure user safety such that users do not bump into each other. Even if the users wore external cameras or sensors, the users may not be accurately represented in the VR space relative to one another if the users are facing away from each other.

SUMMARY OF PARTICULAR EMBODIMENTS

In particular embodiments, two or more users in a shared real-world environment may risk running into or hitting one another while immersed in a VR environment. Particularly, if a user is not within the field of view of an external camera on a VR display device or headset of another user, the VR system may not be able to determine the location of the user relative to the other user and prevent collisions. Thus, one technical challenge may include managing spatial awareness while users are immersed in a VR experience. One solution presented by the embodiments disclosed herein to address the technical challenge of managing spatial awareness of multiple users may be to provide directional warnings, which may be used to alert a user in a shared real-world environment wearing a VR headset of the position and approach of another user in the real-world environment. Alerting a first user of the position and approach of a second user, when the second user is not within the field of view of the first user, may help prevent potential collisions while immersed in the VR experience.

In particular embodiments, one or more computing systems may render, for one or more displays of a VR display device, a first output image of a VR environment based on a field of view of a first user. The one or more computing systems may determine whether a second user is approaching within a threshold distance of the first user and outside the field of view of the first user. The one or more computing systems may render, responsive to determining the second user is approaching within the threshold distance of the first user and outside the field of view of the first user, for the one or more displays of the VR display device, a second output image comprising a directional warning. The directional warning may indicate a direction of movement of the second user relative to the first user.

Certain technical challenges exist for managing spatial awareness of multiple users in a shared VR setting. One technical challenge may include warning users of potential collisions with another user when the other user is not within the field of view of the first user. The solution presented by the embodiments disclosed herein to address this challenge may be to provide directional warnings of the position and approach of the other user. Another technical challenge may include maintaining a first user's immersion in the VR experience while continuing to keep the first user informed of the relative position of a second user in the real-world environment. The solution presented by the embodiments disclosed herein to address this challenge may be to provide an VR avatar of the second user when they are within the field of view of the first user, and transitioning to a directional warning of the position and approach of the second user when they are outside of the field of view of the first user.

Certain embodiments disclosed herein may provide one or more technical advantages. A technical advantage of the embodiments may include managing spatial awareness of multiple users in a shared VR setting may include scaling the triggering and intensity of the directional warning based on the relative risk of collision between users. Another technical advantage of the embodiments may include providing directional warnings in the form of one or more of visual, audio, and haptic cues. Certain embodiments disclosed herein may provide none, some, or all of the above technical advantages. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 2 illustrates an example of a passthrough feature of a virtual reality system.

FIG. 3A illustrates a real-world environment with a first user collocated with one or more second users.

FIG. 3B illustrates an overhead view of the first user having a field of view, and one or more second users.

FIGS. 4A-F illustrate example views of the second user wearing a second VR display device with a direction of movement approaching the first user wearing a first VR display device.

DESCRIPTION OF EXAMPLE EMBODIMENTS

In particular embodiments, two or more users in a shared real-world environment may risk running into or hitting one another while immersed in a VR environment. Particularly, if a user is not within the field of view of an external camera on a VR display device or headset of another user, the VR system may not be able to determine the location of the user relative to the other user and prevent collisions. Thus, one technical challenge may include managing spatial awareness while users are immersed in a VR experience. One solution presented by the embodiments disclosed herein to address the technical challenge of managing spatial awareness of multiple users may be to provide directional warnings, which may be used to alert a user in a shared real-world environment wearing a VR headset of the position and approach of another user in the real-world environment. Alerting a first user of the position and approach of a second user, when the second user is not within the field of view of the first user, may help prevent potential collisions while immersed in the VR experience.

Figure 1A:
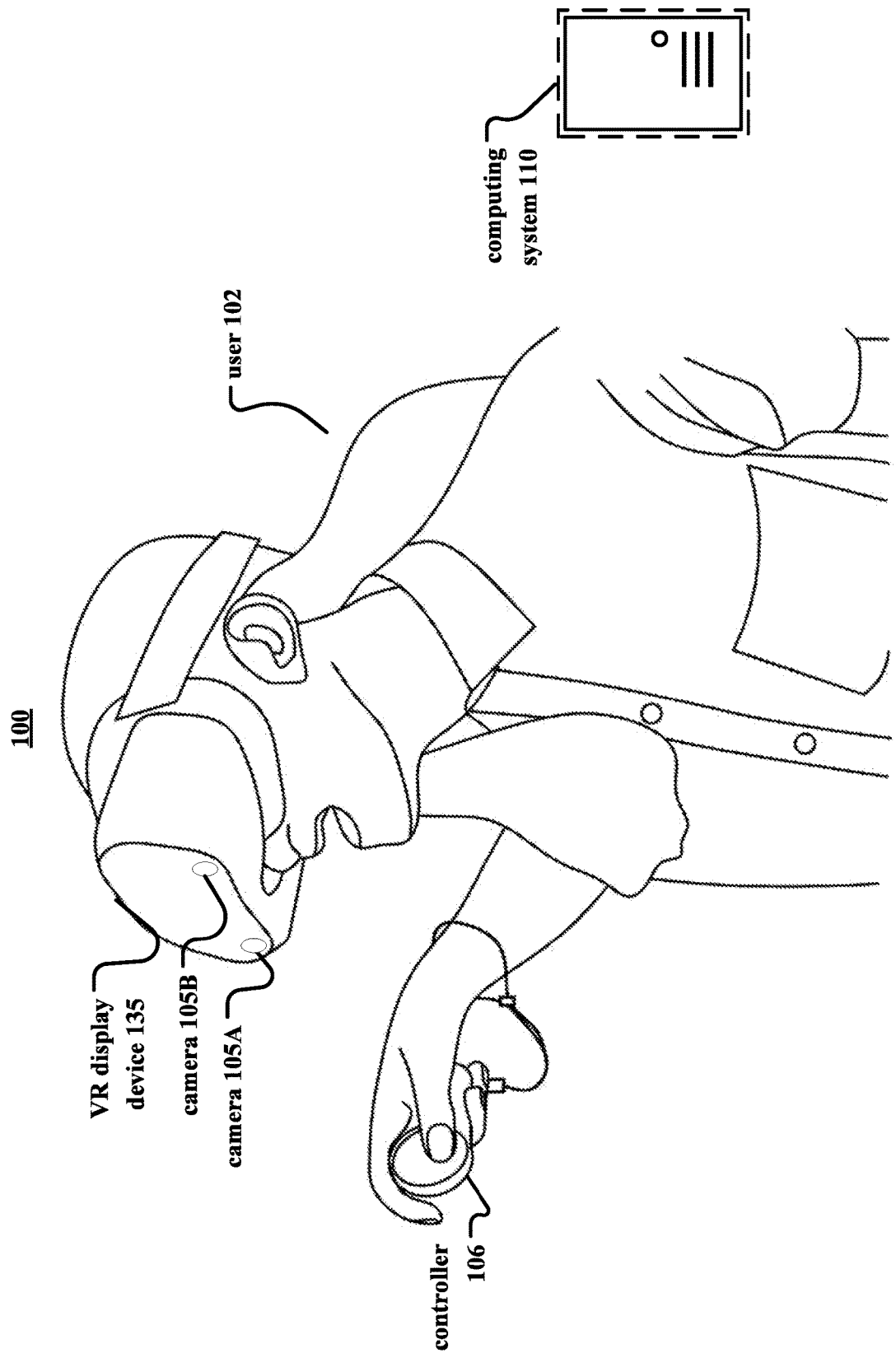
FIG. 1A illustrates an example virtual reality system worn by a user.

FIG. 1A illustrates an example of a virtual reality system 100 worn by a user 102. In particular embodiments, the virtual reality system 100 may comprise a head-mounted VR display device 135, a controller 106, and one or more computing systems 110. The VR display device 135 may be worn over the user's eyes and provide visual content to the user 102 through internal displays (not shown). The VR display device 135 may have two separate internal displays, one for each eye of the user 102 (single display devices are also possible). In particular embodiments, the VR display device 135 may comprise one or more external-facing cameras, such as the two forward-facing cameras 105A and 105B, which can capture images and videos of the real-world environment. As illustrated in FIG. 1A, the VR display device 135 may completely cover the user's field of view. By being the exclusive provider of visual information to the user 102, the VR display device 135 achieves the goal of providing an immersive artificial-reality experience. One consequence of this, however, is that the user 102 may not be able to see the physical (real-world) environment surrounding the user 102, as their vision is shielded by the VR display device 135. As such, the passthrough feature described herein may be technically advantageous for providing the user with real-time visual information about their physical surroundings.

Figure 1B:
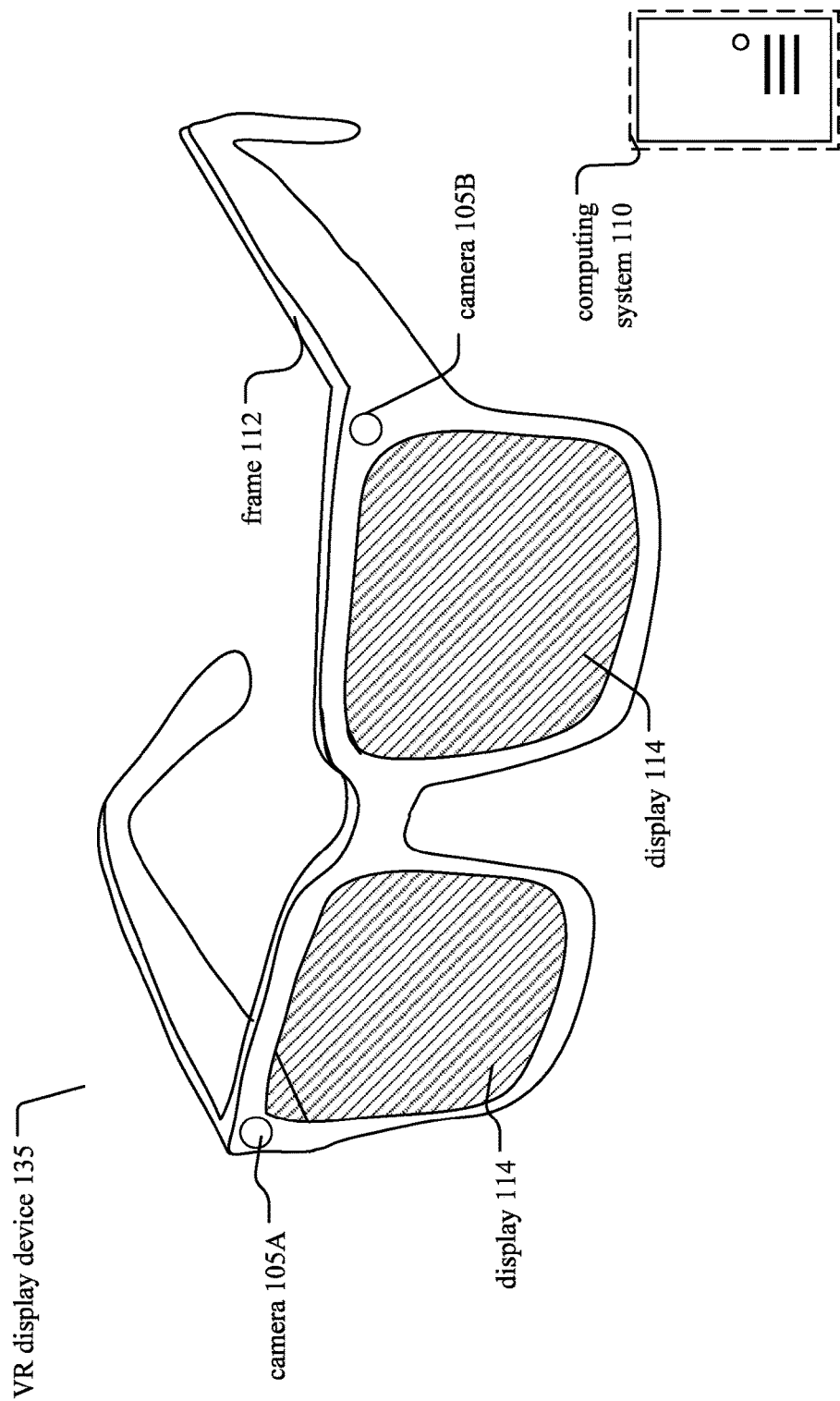
FIG. 1B illustrates an example augmented reality system.

FIG. 1B illustrates an example augmented reality system 101. The augmented reality system 101 may include a head-mounted display VR display device 135 comprising a frame 112, one or more displays 114, and one or more computing systems 110. The VR display device 135 may be worn over the user's eyes (e.g., like eyeglasses) and provide visual content to a user 102 (not shown) through displays 114. The displays 114 may be transparent or translucent allowing a user wearing the VR display device 135 to look through the displays 114 to see the real-world environment and displaying visual artificial reality content to the user at the same time. The VR display device 135 may include an audio device that may provide audio artificial reality content to users. The VR display device 135 may include one or more external-facing cameras, such as the two forward-facing cameras 105A and 105B, which can capture images and videos of the real-world environment. The VR display device 135 may include an eye tracking system to track the vergence movement of the user wearing the VR display device 135. The augmented reality system 101 may further include a controller 106 (not shown) comprising a trackpad and one or more buttons. The controller 106 may receive inputs from users and relay the inputs to the computing system 110. The controller 106 may also provide haptic feedback to users. The computing system 110 may be connected to the VR display device 135 and the controller through cables or wireless connections. The computing system 110 may control the VR display device 135 and the controller to provide the augmented reality content to and receive inputs from users. The computing system 110 may be a standalone host computer system, an on-board computer system integrated with the VR display device 135, a mobile computing device, or any other hardware platform capable of providing artificial reality content to and receiving inputs from users.

FIG. 2 illustrates an example of the passthrough feature of a virtual reality system 100. A user 102 may be wearing a VR display device 135, immersed within a virtual reality environment. A real-world object 145 is in the physical environment surrounding the user 102. However, due to the VR display device 135 blocking the vision of the user 102, the user 102 is unable to directly see the real-world object 145. To help the user perceive their physical surroundings while wearing the VR display device 135, the passthrough feature captures information about the physical environment using, for example, one or more cameras 105 such as external-facing cameras 105A-B. The captured information may then be re-projected to the user 102 based on their viewpoints. In particular embodiments where the VR display device 135 has a right display 136A for the user's right eye and a left display 136B for the user's left eye, the virtual reality system 100 may individually render (1) a re-projected view 145A of the physical environment for the right display 135a based on a viewpoint of the user's right eye and (2) a re-projected view 145B of the physical environment for the left display 135b based on a viewpoint of the user's left eye.

Referring again to FIG. 1A, the VR display device 135 may have external-facing cameras, such as the two forward-facing cameras 105A and 105B shown in FIG. 1A. While only two forward-facing cameras 105A-B are shown, the VR display device 135 may have any number of cameras facing any direction (e.g., an upward-facing camera to capture the ceiling or room lighting, a downward-facing camera to capture a portion of the user's face and/or body, a backward-facing camera to capture a portion of what's behind the user, and/or an internal camera for capturing the user's eye gaze for eye-tracking purposes). The external-facing cameras may be configured to capture the physical environment around the user and may do so continuously to generate a sequence of frames (e.g., as a video). As previously explained, although images captured by the forward-facing cameras 105A-B may be directly displayed to the user 102 via the VR display device 135, doing so may not provide the user with an accurate view of the physical environment since the cameras 105A-B cannot physically be located at the exact same location as the user's eyes. As such, the passthrough feature described herein may use a re-projection technique that generates a 3D representation of the physical environment and then renders images based on the 3D representation from the viewpoints of the user's eyes.

The 3D representation may be generated based on depth measurements of physical objects observed by the cameras 105A-B. Depth may be measured in a variety of ways. In particular embodiments, depth may be computed based on stereo images. For example, the two forward-facing cameras 105A-B may share an overlapping field of view and be configured to capture images simultaneously. As a result, the same physical object may be captured by both cameras 105A-B at the same time. For example, a particular feature of an object may appear at one pixel pA in the image captured by camera 105A, and the same feature may appear at another pixel pB in the image captured by camera 105B. As long as the depth measurement system knows that the two pixels correspond to the same feature, the virtual reality system 100 could use triangulation techniques to compute the depth of the observed feature. For example, based on the camera 105A's position within a 3D space and the pixel location of pA relative to the camera 105A's field of view, a line could be projected from the camera 105A and through the pixel pA. A similar line could be projected from the other camera 105B and through the pixel pB. Since both pixels are supposed to correspond to the same physical feature, the two lines should intersect. The two intersecting lines and an imaginary line drawn between the two cameras 105A and 105B form a triangle, which could be used to compute the distance of the observed feature from either camera 105A or 105B or a point in space where the observed feature is located.

In particular embodiments, the pose (e.g., x-y-z position and r-p-y orientation) of the VR display device 135 within the environment may be needed. For example, in order to render the appropriate display for the user 102 while he is moving about in a virtual environment, the virtual reality system 100 may need to determine his position and orientation at any moment. Based on the pose of the VR display device, the virtual reality system 100 may further determine the viewpoint of either of the cameras 105A and 105B or either of the user's eyes. In particular embodiments, the VR display device 135 may be equipped with inertial-measurement units ("IMU"). The data generated by the IMU, along with the stereo imagery captured by the external-facing cameras 105A-B, allow the virtual reality system 100 to compute the pose of the VR display device 135 using, for example, SLAM (simultaneous localization and mapping) or other suitable techniques.

In particular embodiments, the virtual reality system 100 may further have one or more controllers 106 that enable the user 102 to provide inputs. The controller 106 may communicate with the VR display device 135 or a separate one or more computing systems 110 via a wireless or wired connection. The controller 106 may have any number of buttons or other mechanical input mechanisms. In addition, the controller 106 may have an IMU so that the pose of the controller 106 may be tracked. The controller 106 may further be tracked based on predetermined patterns on the controller. For example, the controller 106 may have several infrared LEDs or other known observable features that collectively form a predetermined pattern. Using a sensor or camera, the virtual reality system 100 may be able to capture an image of the predetermined pattern on the controller. Based on the observed orientation of those patterns, the system may compute the controller's position and orientation relative to the sensor or camera.

The virtual reality system 100 may further include one or more computing systems 110. The one or more computing systems 110 may be a stand-alone unit that is physically separate from the VR display device 135 or the computer system 110 may be integrated with the VR display device 135. In embodiments where the one or more computing systems 110 is a separate unit, the one or more computing systems 110 may be communicatively coupled to the VR display device 135 via a wireless or wired link. The one or more computing systems 110 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by a virtual reality system 100 depends on the capabilities of its one or more computing systems 110.

In embodiments where the one or more computing systems 110 is a high-performance device, an embodiment of the passthrough feature may be designed as follows. Through the external-facing cameras 105A-B of the VR display device 135, a sequence of images of the surrounding physical environment may be captured. The information captured by the cameras 105A-B, however, may be misaligned with what the user's eyes may capture since the cameras could not spatially coincide with the user's eyes (e.g., the cameras may be located some distance away from the user's eyes and, consequently, have different viewpoints). As such, simply displaying what the cameras captured to the user may not be an accurate representation of what the user should perceive.

Instead of simply displaying what was captured, the passthrough feature may re-project information captured by the external-facing cameras 105A-B to the user. Each pair of simultaneously captured stereo images may be used to estimate the depths of observed features. As explained above, to measure depth using triangulation, the one or more computing systems 110 may find correspondences between the stereo images. For example, the one or more computing systems 110 may determine which two pixels in the pair of stereo images correspond to the same observed feature. A high-performance one or more computing systems 110 may solve the correspondence problem using its GPU and optical flow techniques, which are optimized for such tasks. The correspondence information may then be used to compute depths using triangulation techniques. Based on the computed depths of the observed features, the one or more computing systems 110 could determine where those features are located within a 3D space (since the one or more computing systems 110 also knows where the cameras are in that 3D space). The result may be represented by a dense 3D point cloud, with each point corresponding to an observed feature. The dense point cloud may then be used to generate 3D models of objects in the environment. When the system renders a scene for display, the system could perform visibility tests from the perspectives of the user's eyes. For example, the system may cast rays into the 3D space from a viewpoint that corresponds to each eye of the user. In this manner, the rendered scene that is displayed to the user may be computed from the perspective of the user's eyes, rather than from the perspective of the external-facing cameras 105A-B.

The process described above, however, may not be feasible for a resource-limited computing unit (e.g., a mobile phone may be the main computational unit for the VR display device 135). For example, unlike systems with powerful computational resources and ample energy sources, a mobile phone cannot rely on GPUs and computationally-expensive algorithms (e.g., optical flow) to perform depth measurements and generate an accurate 3D model of the environment. Thus, to provide passthrough on resource-limited devices, an optimized process is needed.

In particular embodiments, the computing device may be configured to dynamically determine, at runtime, whether it is capable of or able to generate depth measurements using (1) the GPU and optical flow or (2) the optimized technique using video encoder and motion vectors, as described in further detail below. For example, if the device has a GPU and sufficient power budget (e.g., it is plugged into a power source, has a full battery, etc.), it may perform depth measurements using its GPU and optical flow. However, if the device does not have a GPU or has a stringent power budget, then it may opt for the optimized method for computing depths.

In particular embodiments, the VR system 100 may render, for one or more displays of a VR display device 135, a first output image of a VR environment 160 based on a field of view of a first user. The VR environment 140 may be a VR game, VR office, or other VR setting that is displayed on the VR display device 135.

FIG. 3A illustrates a real-world environment 150 with a first user 102a collocated with one or more second users 102b. FIG. 3B illustrates an overhead view of the first user 102a having a field of view (FOV) 165, and one or more second users 102b. Each of the first user 102a and one or more second users 102b may be wearing the VR display device 135. As the first user 102a and/or the one or more second users 102b move around the real-world environment 150, the first user 102a and/or the one or more second users 102b may fall out of the field of view of one another. For example, as the second user 102b approaches the first user 102a from outside the field of view 165 of the first user 102a, the first user 102a and the second user 102b risk colliding with one another. Certain technical challenges exist for managing spatial awareness of multiple users in a shared VR setting. One technical challenge may include warning a first user 102a of potential collisions with one or more second users 102b when the one or more second users 102b are not within the field of view 165 of the first user 102a. The solution presented by the embodiments disclosed herein to address this challenge may be to provide directional warnings of the position and approach of the one or more second users 102b.

In particular embodiments, the VR system 100 may determine whether a second user 102b is approaching within a threshold distance of the first user 102a and outside the field of view of the first user 165. A VR display device 135 may localize or orient itself relative to another VR display device 135. Localization information may be used to determine a proximity of one VR display device 135 (e.g., of a first user 102a) another VR display device 135 (e.g., of a second user 102b). As the second user 102b approaches within a threshold distance (e.g., 1 meter, 5 meters, 10 meters, etc.) of the first user 102b, and from outside the field of view 165 of the first user 102a, the VR system may determine the second user is approaching within the threshold distance. Although this disclosure describes determining whether a user is approaching within a threshold distance in a particular manner, this disclosure contemplates determining whether a user is approaching within a threshold distance in any suitable manner.

In particular embodiments, the VR system 100 may render, responsive to determining the second user 102b is approaching within the threshold distance of the first user 102a and outside the field of view 165 of the first user 102a, for the one or more displays of the VR display device 135, a second output image comprising a directional warning. The directional warning may indicate a direction of movement of the second user 102b relative to the first user 102a. FIGS. 4A-F illustrate example views of the second user 102b wearing a second VR display device 135b with a direction of movement 175 approaching the first user 102a wearing a first VR display device 135a. Based on the second user 102b direction of movement 175 and approach toward the first user 102a, the VR display device 135a may display a directional warning 180. The directional warning 180 may comprise a visual cue or alert. As an example and not by way of limitation, the VR display device 135 may display or render a colored band overlaid on the one or more displays of the VR display device 135. As another example and not by way of limitation, the VR display device 135 may display or render a flashing light, glow, passthrough view, or other visual cue to alert the user 102 of an impending collision with another user or obstacle. The visual alert may be directional, such that a potential collision from the right of the user 102 may cause a right portion of the VR display device 135 to provide the visual alert. The intensity or size of the portion of the visual alert may increase as the potential for collision increases. The directional warning 180 may be based on determining a relative speed of one VR display device with respect to another VR display device. If a second VR display device 135b is approaching the first VR display device 135a with a direction of movement 175 with a speed greater than a threshold speed (e.g., 5 miles per hour), the VR system 100 may render a directional warning 180 on the first VR display device 135a. As an example and not by way of limitation, if the second user 102b wearing the second VR display device 135b is jogging or running towards the first user 102a wearing the first VR display device 135a, the first VR display device 135a may render a directional warning 180 to alert the first user 102a of the rapidly approaching second user 102b. The directional warning 180 may comprise a haptic cue or alert. As an example and not by way of limitation, one or more of the VR display device 135 and/or the controllers 106 may pulse or vibrate to alert the user 102 of an impending collision with another user or obstacle. The haptic alert may be directional, such that a potential collision from the right of the user 102 may cause the right-hand controller 106 to provide the haptic alert. The frequency of the haptic alert may increase as the potential for collision increases. As an example and not by way of limitation, the left or right controllers associated with the VR headset may vibrate to alert users of potential collisions from the respective left or right sides. The directional warning 180 may comprise an audio cue or auditory alert. As an example and not by way of limitation, VR display device 135 may play a tone, sound, or other noise to alert the user 102 of an impending collision with another user or obstacle. The auditory alert may be directional, such that a potential collision from the right of the user 102 may cause a right-side speaker of the VR display device 135 to provide the auditory alert. The frequency of the auditory alert may increase as the potential for collision increases. Some or all other audio played through the VR display device 135 may be muted, lowered, or ducked so that the audio cue or auditory alert is audible, even in a noisy virtual environment. A technical advantage of the embodiments may include providing directional warnings in the form of one or more of visual, audio, and haptic cues.

In particular embodiments, and based on a determined direction of movement of the second user 102b relative to the first user 102a, the VR system 100 may determine whether the second user 102b is approaching within the threshold distance of the first user 102a. That is, the VR system 100 may determine a direction of approach of the second VR display device 135b relative to the first VR display device 135a. In particular embodiments, and based on a determined proximity of the second user 102b relative to the first user 102a, the VR system 100 may determine whether the second user 102b is approaching within the threshold distance of the first user 102a. The directional warning 180 rendered on the first VR display device 135a may comprise an indication of the direction of approach and/or proximity of the second VR display device 135b. A technical advantage of the embodiments may include providing spatial information by determining the optimal direction for a directional warning 180.

In particular embodiments, the directional warning 180 may be rendered on or near an edge of the one or more displays of the VR display device 135 corresponding to the direction of movement of the second user 102b relative to the first user 102a. FIG. 4A illustrates a second user 102b wearing a second VR display device 135b approaching a first user 102a wearing a first VR display device 135a from the right of the first user 102a. That is, the direction of approach (e.g., the direction of movement 175) of the second VR display device 135b is perpendicular to the field of view 165 of the first VR display device 135a. Accordingly, the directional warning 180 may be rendered in a peripheral view of the first VR display device 135a to indicate the direction of approach of the second VR display device 135b is perpendicular (and to the right) to the field of view 165. The VR system 100 may also determine the proximity of the second user 102b relative to the first user 102a based on the second user 102b approaching within the threshold distance of the first user 102a, such that the directional warning 180 indicates the second user 102b is proximate to the first user 102a, perpendicular to the first user 102a, and to the right of the first user 102a.

FIG. 4B illustrates a second user 102b wearing a second VR display device 135b approaching a first user 102a wearing a first VR display device 135a from the left of the first user 102a. That is, the direction of approach (e.g., the direction of movement 175) of the second VR display device 135b is perpendicular to the field of view 165 of the first VR display device 135a. Accordingly, the directional warning 180 may be rendered in a peripheral view of the first VR display device 135a to indicate the direction of approach of the second VR display device 135b is perpendicular (and to the left) to the field of view 165. The VR system 100 may also determine the proximity of the second user 102b relative to the first user 102a based on the second user 102b approaching within the threshold distance of the first user 102a, such that the directional warning 180 indicates the second user 102b is proximate to the first user 102a, perpendicular to the first user 102a, and to the left of the first user 102a.

FIG. 4C illustrates a second user 102b wearing a second VR display device 135b approaching a first user 102a wearing a first VR display device 135a from behind of the first user 102a. That is, the direction of approach (e.g., the direction of movement 175) of the second VR display device 135b is away from the field of view 165 of the first VR display device 135a. Accordingly, the directional warning 180 may be rendered in a peripheral view of and behind the first VR display device 135a to indicate the direction of approach of the second VR display device 135b is behind the field of view 165. The VR system 100 may also determine the proximity of the second user 102b relative to the first user 102a based on the second user 102b approaching within the threshold distance of the first user 102a, such that the directional warning 180 indicates the second user 102b is proximate to the first user 102a, and behind the first user 102a.

FIG. 4D illustrates a second user 102b wearing a second VR display device 135b approaching a first user 102a wearing a first VR display device 135a from the front of the first user 102a. That is, the direction of approach (e.g., the direction of movement 175) of the second VR display device 135b is toward the field of view 165 of the first VR display device 135a. Accordingly, the directional warning 180 may be rendered in the field of view 165 the first VR display device 135a to indicate the direction of approach of the second VR display device 135b is within the field of view 165. The VR system 100 may also determine the proximity of the second user 102b relative to the first user 102a based on the second user 102b approaching within the threshold distance of the first user 102a, such that the directional warning 180 indicates the second user 102b is proximate to the first user 102a, and in front of the first user 102a. In particular embodiments, no directional warning is 180 will be indicated when the second user 102b is within the field of view 165 of the first VR display device 135a.

Figure 4E:
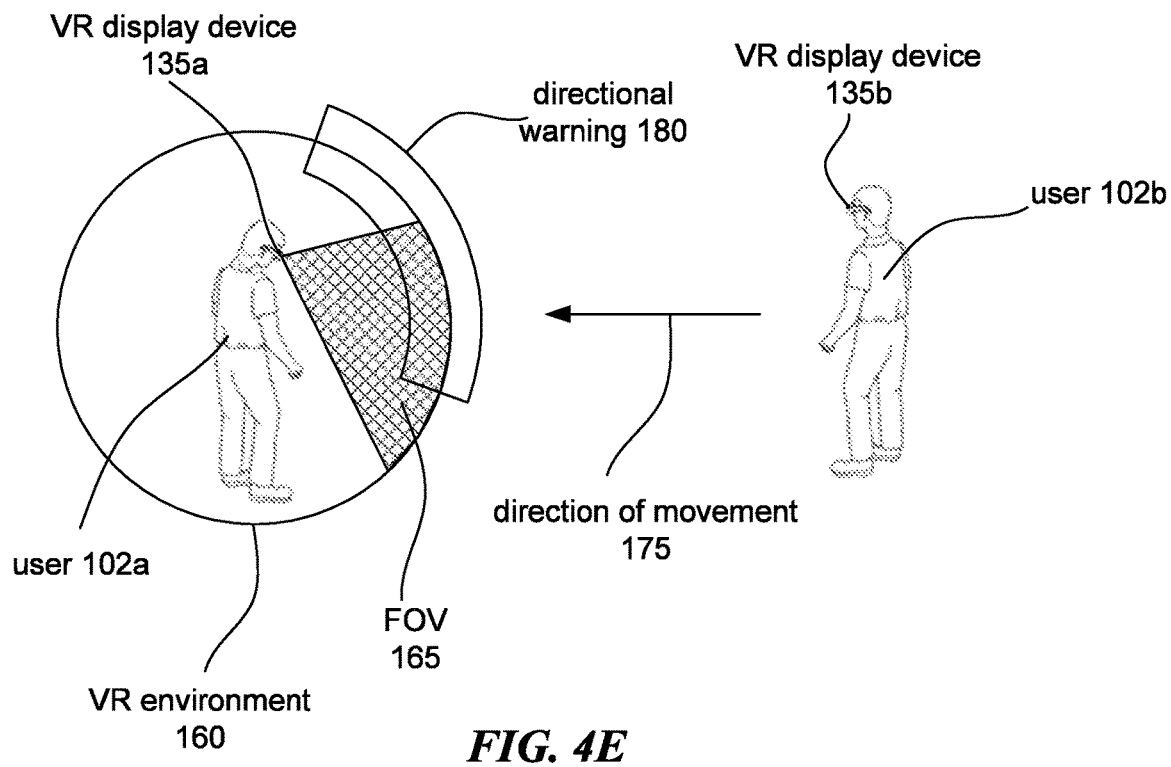

FIG. 4E illustrates a second user 102b wearing a second VR display device 135b approaching a first user 102a wearing a first VR display device 135a, while the first user 102a is looking downwards. As the second user 102b approaches the first user 102a while the first user 102a is looking down, the directional warning 180 may be rendered in the field of view 165 the first VR display device 135a to indicate the direction of approach of the second VR display device 135b above the field of view 165. The VR system 100 may also determine the proximity of the second user 102b relative to the first user 102a based on the second user 102b approaching within the threshold distance of the first user 102a, such that the directional warning 180 indicates the second user 102b is proximate to the first user 102a.

Figure 4F:
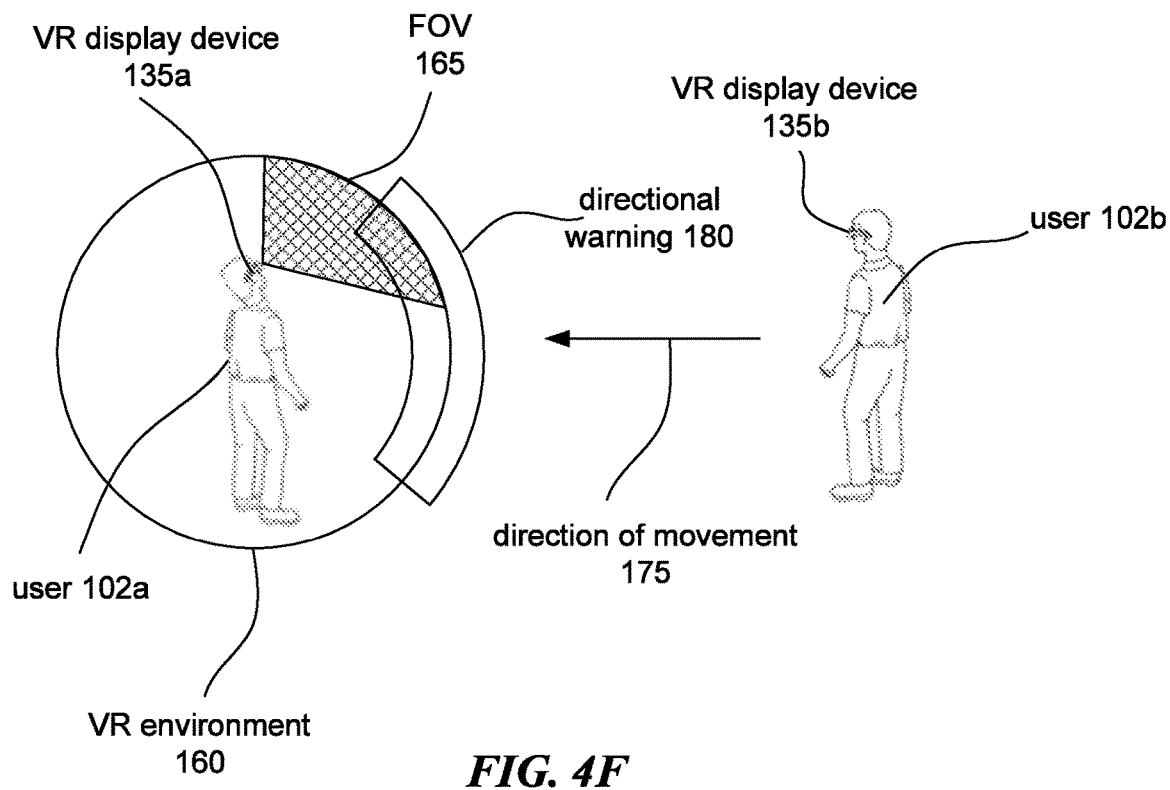

FIG. 4F illustrates a second user 102b wearing a second VR display device 135b approaching a first user 102a wearing a first VR display device 135a, while the first user 102a is looking upwards. As the second user 102b approaches the first user 102a while the first user 102a is looking up, the directional warning 180 may be rendered in the field of view 165 of the first VR display device 135a to indicate the direction of approach of the second VR display device 135b below the field of view 165. The VR system 100 may also determine the proximity of the second user 102b relative to the first user 102a based on the second user 102b approaching within the threshold distance of the first user 102a, such that the directional warning 180 indicates the second user 102b is proximate to the first user 102a.

In situations where two or more users (e.g., the second user 102b and one or more other users 102) approach the first user 102a from two or more separate directions, the directional warning 180 may be rendered in the field of view 165 of the first VR display device 135a to indicate the directions of approach of the two or more other VR display devices (e.g., the second VR display device 135*b*, and one or more other VR display devices 135 corresponding to the one or more other users 102). As an example and not by way of limitation, two users 102 approaching the first user 102*a* from the left and right will result in the first VR display device 135*a* rendering a directional warning 180 in a peripheral view of the first VR display device 135*a* to indicate the direction of approach of the one of the VR display devices 135 is perpendicular and to the left to the field of view 165, and simultaneously indicate the direction of approach of the one of the VR display devices 135 is perpendicular and to the right to the field of view 165 (e.g., a combination of the warnings illustrated in FIG. 4A and FIG. 4B).

Figure 5:
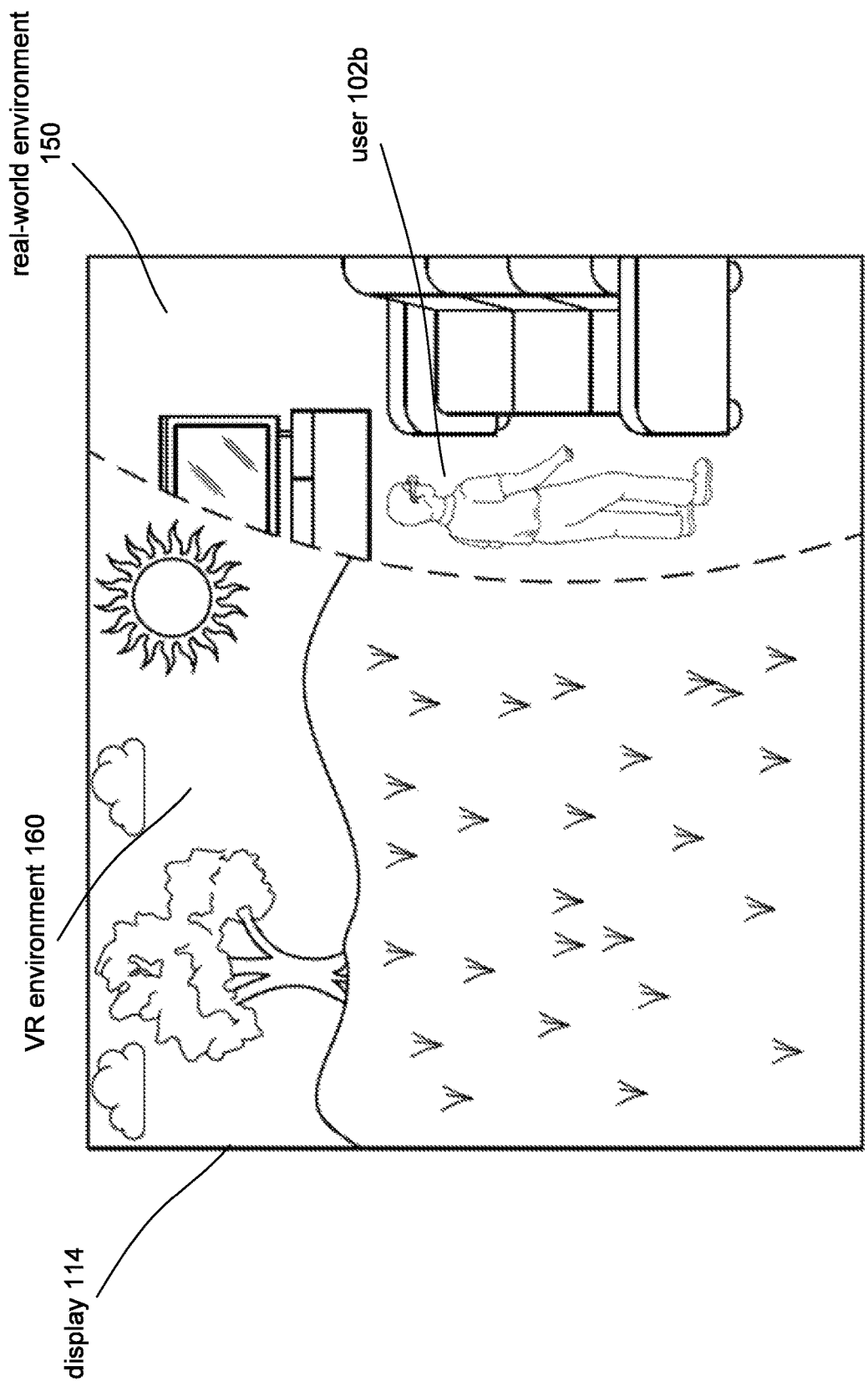
FIG. 5 illustrates an example of a display view of a VR display device.

FIG. 5 illustrates an example of a display 114 view of a VR display device 135. The display 114 renders a VR environment 160, with a passthrough view of the real-world environment 150. In particular embodiments, the directional warning 180 may comprise rendering a passthrough view of the real-world environment 150 to alert the first user 102*a* of the co-located second user 102*b*. That is, a passthrough view directional warning 180 may be triggered to render at least on a portion of the display 114 a view of the real-world environment 150 comprising the one or more second users 102*b*. Passthrough views are discussed in U.S. patent application Ser. No. 17/139,434, which is incorporated by reference herein.

A technical challenge may include maintaining a first user's immersion in the VR experience while continuing to keep the first user 102*a* informed of the relative position of a second user 102*b* in the real-world environment 150. The solution presented by the embodiments disclosed herein to address this challenge may be to provide an VR avatar 185 of the second user when they are within the field of view 165 of the first user 102*a*, and transitioning to a directional warning 180 of the position and approach of the second user 102*b* when they are outside of the field of view 165 of the first user 102*a*. The VR avatar 185 corresponding to real-world positions of collocated users may be differentiated from VR avatars of users that are not proximate to the first user 102*a*. As an example and not by way of limitation, a directional warning may be rendered for the VR avatar 185 corresponding to the second user 102*b* that is proximate to the first user 102*a*, while a VR avatar 185 corresponding to the second user 102*b* that is not proximate to the first user 102*a* will not trigger a directional warning (e.g., the first user 102*a* may safely walk through this VR avatar 185).

Figure 6A:
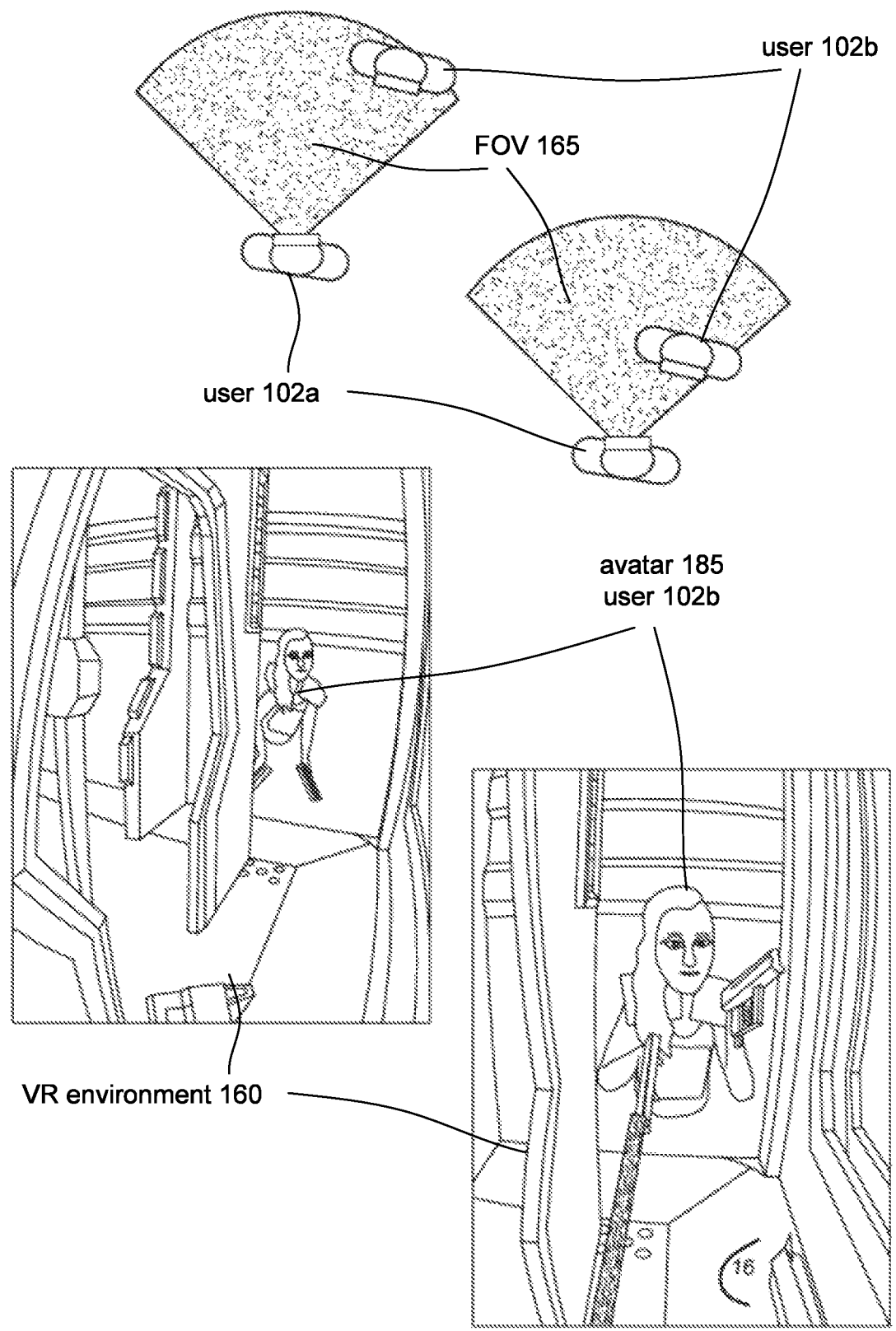
FIG. 6A illustrates an example of a display view of a VR display device with a VR avatar corresponding to the second user.
Figure 6B:
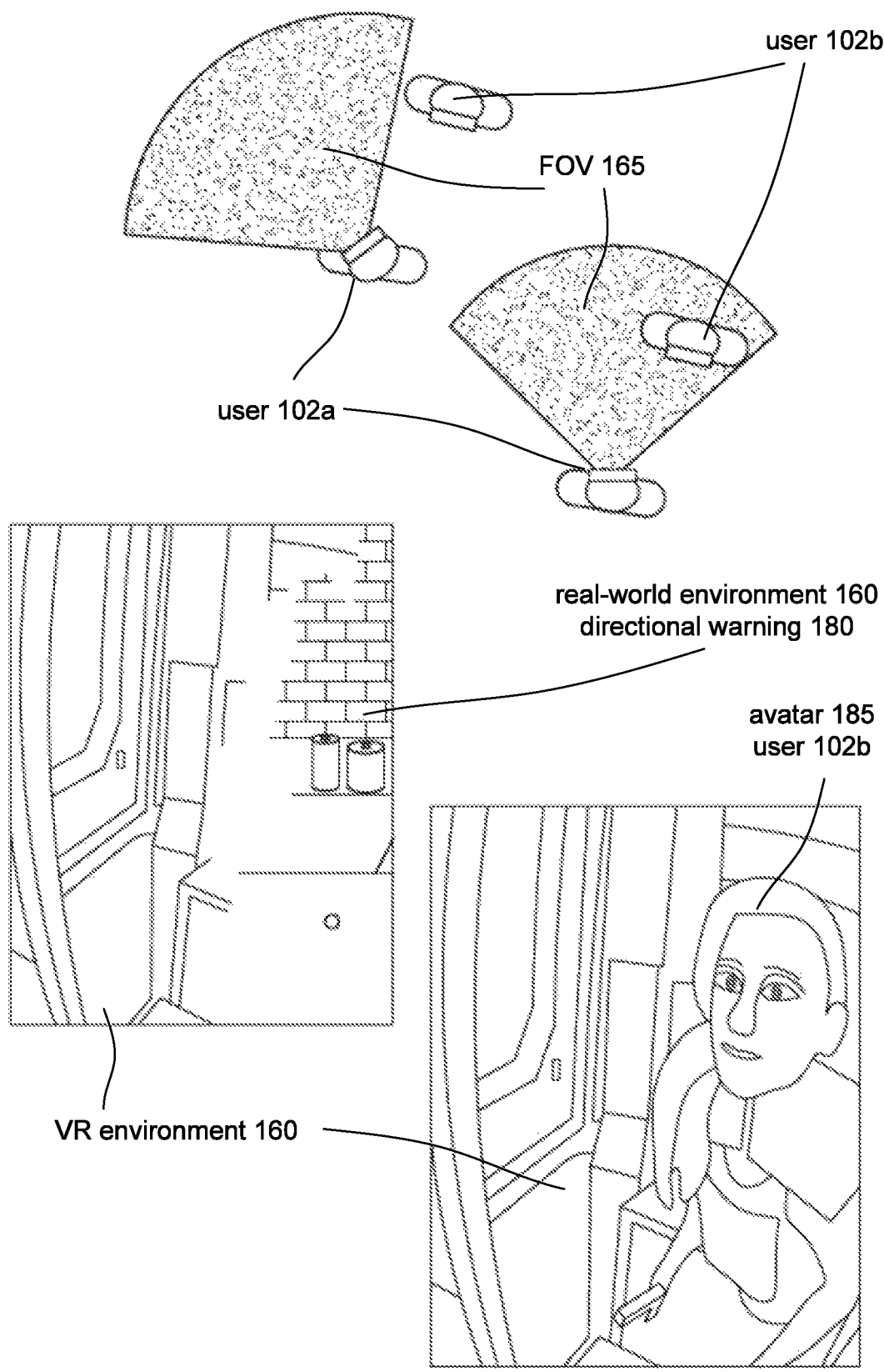
FIG. 6B illustrates an example of a display view of a VR display device with a VR avatar corresponding to the second user, and a directional warning.

FIG. 6A illustrates an example of a display 114 view of a VR display device 135 with a VR avatar 185 corresponding to the second user 102*b*. While immersed in the VR environment 160, the first user 102*a* may view the second user 102*b* as a VR avatar 185. That is, once the second user 102*b* is within the field of view 165 of the first user 102*a*, the VR avatar 185 corresponding to the second user 102*b* may appear in the output image for the first user 102*a* to alert the first user 102*a* to the presence of the second user 102*b*. The pose of the VR avatar 185 in the VR environment 160 in the output image for the first user 102*a* may correspond to the pose of the second user 102*b* in the real-world environment 150 relative to the first user 102*a*. Thus, the first user's immersion in the VR experience is maintained while continuing to keep the user informed of the relative position and orientation of the second user 102*b* in the real-world environment 150. FIG. 6B illustrates an example of a display 114 view of a VR display device 135 with a VR avatar 185 corresponding to the second user 102*b*, and a directional warning 180. As the second user 102 approaches the first user 102*a* and outside the field of view 165 of the first user 102*a*, a directional warning 180 may appear in the display of the first user 102*a*. For example, a passthrough view of the real-world environment 150 may appear in the display of the first user 102*a* (although any other directional warning 180 may be used). However, once the second user 102*b* is within the field of view 165 of the first user 102*a*, the second user 102*b* may be rendered as a VR avatar 185 in the VR environment 160.

A technical advantage of the embodiments may include managing spatial awareness of multiple users in a shared VR environment 160 may include scaling the triggering and intensity of the directional warning 180 based on the relative risk of collision between users. The intensity of the directional warning may increase proportionally with the risk of collision. For example, if the second user 102*b* is approaching the first user 102*a* from the left side of the first user 102*a*, a colored band may appear on the left-hand side of the output image of the first user's VR display device 135. However, the intensity of the colored band may increase proportionally with the risk of collision between the first user 102*a* and the second user 102*b*. As another example and not by way of limitation, the directional warning 180 may also appear as a passthrough view of the real-world environment 150. For example, if the second user 102*b* approaches the first user from the from the right side of the first user 102*a*, a passthrough view of the real-world environment 150 may appear on the right-hand side of the first user's VR display device 135. In situations with three or more users (e.g., the first user 102*a*, the second user 102*b*, and one or more other users 102), multiple directional warnings 180 may appear. As an example and not by way of limitation, the multiple directional warnings 180 may appear as a passthrough view of the real-world environment 150 on multiple sides of the field of view 165 of the first user 102*a*, or a flashing light may appear on one side of the field of view 165 of the first user 102*a* while a passthrough view appears on another side of the field of view 165 of the first user 102*a*.

The triggering and/or intensity of the directional warning 180 may also depend on the relative risk of collision between the first user 102*a* and the second user 102*b*. The relative risk of collision may be based on one or more of the proximity, speed, and activity of the users. As an example and not by way of limitation, if the risk is low, the directional warning 180 may be a more passive colored band on the edge of the output image on the first user's display device 135 (e.g., perhaps starting as a yellow band and increasing to red as the risk of collision between the first user 102*a* and the second user 102*b* increases). As another example and not by way of limitation, as the risk of collision between the first user 102*a* and the second user 102*b* increases, the rendering of the VR environment 160 may transition to a partial passthrough view or passthrough view of the real-world environment 150 in the direction of the second user 102*b*, breaking the first user's immersion in the VR experience to alert the first user 102*a* of an imminent risk of danger in the real-world environment 150.

The directional warning 180 may be triggered based on a proximity of the first user 102*a* to the second user 102*b*. That is, the triggering and/or intensity of the directional warning may be inversely proportional to the distance between the first user 102*a* and the second user 102*b*. As an example and not by way of limitation, if the first user 102*a* and the second user 102*b* are within a threshold distance of each other, the directional warning will be triggered, and the directional warning may be more intense as that distance between the first user 102*a* and the second user 102*b* decreases.

The triggering and/or intensity of the directional warning 180 may be based on the speed of the first user 102a relative to the second user 102b. That is, the triggering and/or intensity of the directional warning 180 may be proportional to the relative speed between the first user 102a and the second user 102b. As an example and not by way of limitation, the directional warning 180 may be triggered earlier if the second user 102b is quickly approaching the first user 102a. As another example and not by way of limitation, the directional warning 180 may be more intense if the second user 102b is quickly approaching the first user 102a.

The triggering and/or intensity of the directional warning 180 may be based on the type of VR experience the first user 102a and the second user 102b. For example, VR experiences that do not require a lot of movement (e.g., VR chess) may have a higher directional warning trigger and/or intensity threshold than a VR experiences that require a lot of movement (e.g., VR tennis).

Figure 7:
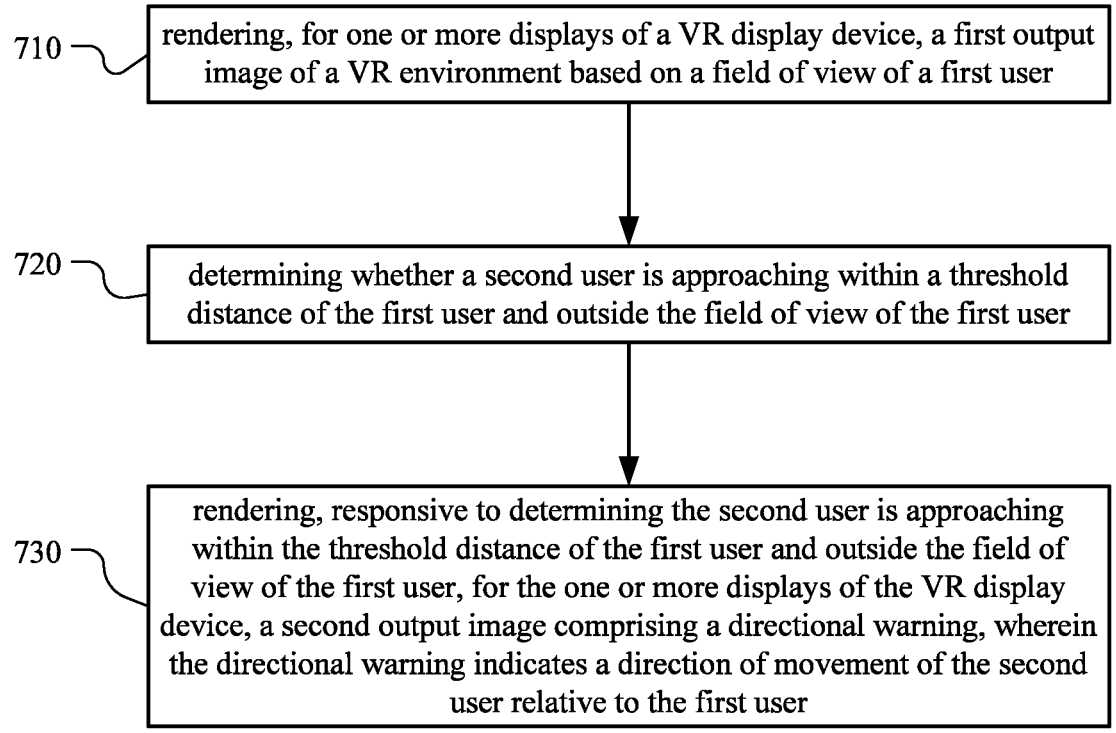
FIG. 7 illustrates an example method for managing spatial awareness of VR display devices in a shared real-world environment.

FIG. 7 illustrates an example method 700 for managing spatial awareness of VR display devices in a shared real-world environment. The method may begin at step 710, where a computing system may render, for one or more displays of a VR display device, a first output image of a VR environment based on a field of view of a first user. At step 720, the one or more computing systems may determine whether a second user is approaching within a threshold distance of the first user and outside the field of view of the first user. At step 730, the one or more computing systems may render, responsive to determining the second user is approaching within the threshold distance of the first user and outside the field of view of the first user, for the one or more displays of the VR display device, a second output image comprising a directional warning. The directional warning may indicate a direction of movement of the second user relative to the first user. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for managing spatial awareness of VR display devices in a shared real-world environment including the particular steps of the method of FIG. 7, this disclosure contemplates any suitable method for managing spatial awareness of VR display devices in a shared real-world environment including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
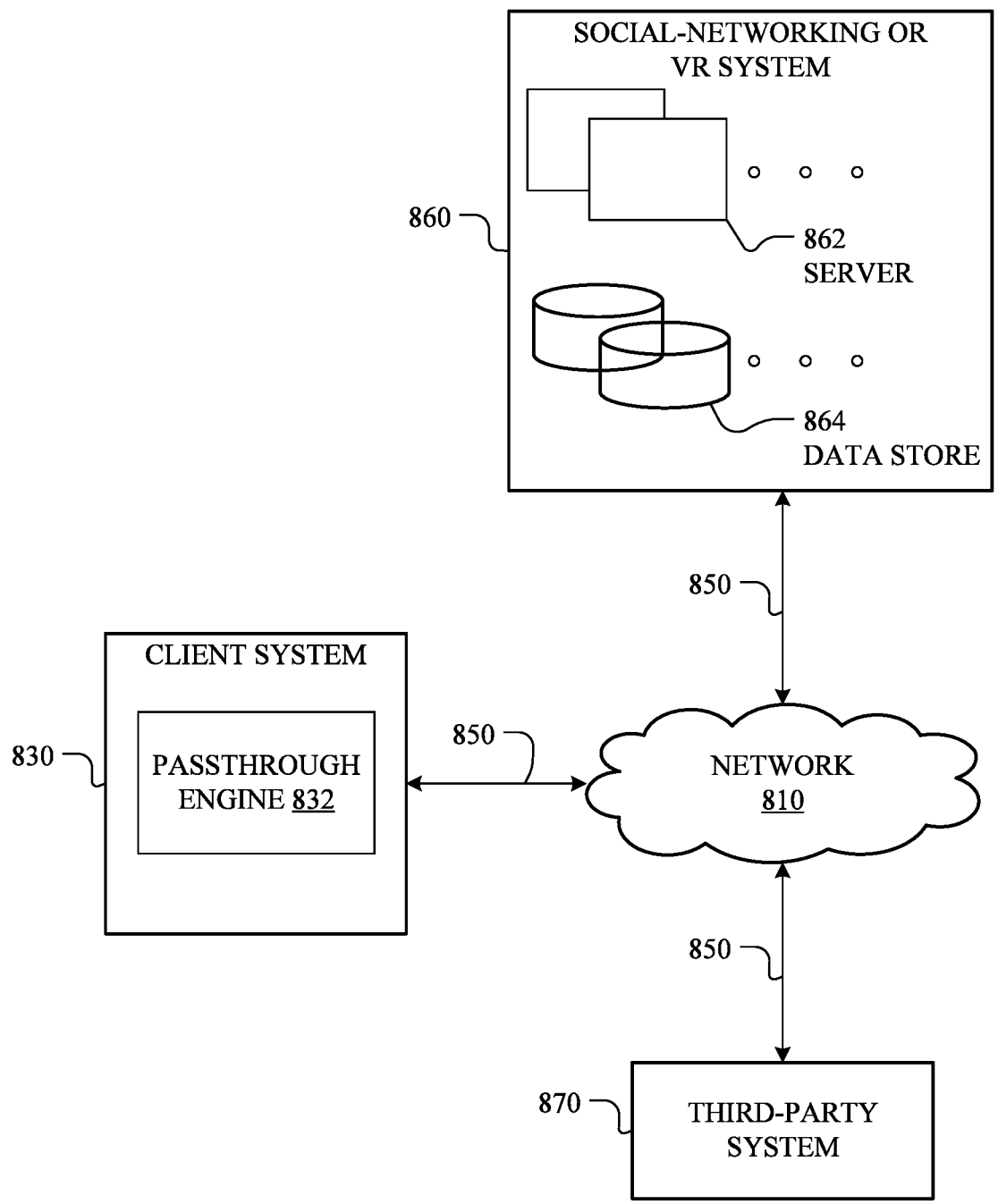
FIG. 8 illustrates an example network environment associated with a social-networking system.

FIG. 8 illustrates an example network environment 800 associated with a social-networking system. Network environment 800 includes a client system 830, a social-networking system 860, and a third-party system 870 connected to each other by a network 810. Although FIG. 8 illustrates a particular arrangement of client system 830, social-networking system 860, third-party system 870, and network 810, this disclosure contemplates any suitable arrangement of client system 830, social-networking system 860, third-party system 870, and network 810. As an example and not by way of limitation, two or more of client system 830, social-networking system 860, and third-party system 870 may be connected to each other directly, bypassing network 810. As another example, two or more of client system 830, social-networking system 860, and third-party system 870 may be physically or logically co-located with each other in whole or in part. Moreover, although FIG. 8 illustrates a particular number of client systems 830, social-networking systems 860, third-party systems 870, and networks 810, this disclosure contemplates any suitable number of client systems 830, social-networking systems 860, third-party systems 870, and networks 810. As an example and not by way of limitation, network environment 800 may include multiple client system 830, social-networking systems 860, third-party systems 870, and networks 810.

This disclosure contemplates any suitable network 810. As an example and not by way of limitation, one or more portions of network 810 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 810 may include one or more networks 810.

Links 850 may connect client system 830, social-networking system 860, and third-party system 870 to communication network 810 or to each other. This disclosure contemplates any suitable links 850. In particular embodiments, one or more links 850 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 850 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 850, or a combination of two or more such links 850. Links 850 need not necessarily be the same throughout network environment 800. One or more first links 850 may differ in one or more respects from one or more second links 850.

In particular embodiments, client system 830 may be an electronic device including hardware, software, or embedded logic components or a combination of two or more such components and capable of carrying out the appropriate functionalities implemented or supported by client system 830. As an example and not by way of limitation, a client system 830 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 830. A client system 830 may enable a network user at client system 830 to access network 810. A client system 830 may enable its user to communicate with other users at other client systems 830.

In particular embodiments, client system 830 may include a web browser 832, and may have one or more add-ons, plug-ins, or other extensions. A user at client system 830 may enter a Uniform Resource Locator (URL) or other address directing the web browser 832 to a particular server (such as server 862, or a server associated with a third-party system 870), and the web browser 832 may generate a Hyper Text Transfer Protocol (HTTP) request and communicate the HTTP request to server. The server may accept the HTTP request and communicate to client system 830 one or more Hyper Text Markup Language (HTML) files responsive to the HTTP request. Client system 830 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts, combinations of markup language and scripts, and the like. Herein, reference to a webpage encompasses one or more corresponding webpage files (which a browser may use to render the webpage) and vice versa, where appropriate.

In particular embodiments, social-networking system 860 may be a network-addressable computing system that can host an online social network. Social-networking system 860 may generate, store, receive, and send social-networking data, such as, for example, user-profile data, concept-profile data, social-graph information, or other suitable data related to the online social network. Social-networking system 860 may be accessed by the other components of network environment 800 either directly or via network 810. As an example and not by way of limitation, client system 830 may access social-networking system 860 using a web browser 832, or a native application associated with social-networking system 860 (e.g., a mobile social-networking application, a messaging application, another suitable application, or any combination thereof) either directly or via network 810. In particular embodiments, social-networking system 860 may include one or more servers 862. Each server 862 may be a unitary server or a distributed server spanning multiple computers or multiple datacenters. Servers 862 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 862 may include hardware, software, or embedded logic components or a combination of two or more such components for carrying out the appropriate functionalities implemented or supported by server 862. In particular embodiments, social-networking system 860 may include one or more data stores 864. Data stores 864 may be used to store various types of information. In particular embodiments, the information stored in data stores 864 may be organized according to specific data structures. In particular embodiments, each data store 864 may be a relational, columnar, correlation, or other suitable database. Although this disclosure describes or illustrates particular types of databases, this disclosure contemplates any suitable types of databases. Particular embodiments may provide interfaces that enable a client system 830, a social-networking system 860, or a third-party system 870 to manage, retrieve, modify, add, or delete, the information stored in data store 864.

In particular embodiments, social-networking system 860 may store one or more social graphs in one or more data stores 864. In particular embodiments, a social graph may include multiple nodes-which may include multiple user nodes (each corresponding to a particular user) or multiple concept nodes (each corresponding to a particular concept)—and multiple edges connecting the nodes. Social-networking system 860 may provide users of the online social network the ability to communicate and interact with other users. In particular embodiments, users may join the online social network via social-networking system 860 and then add connections (e.g., relationships) to a number of other users of social-networking system 860 to whom they want to be connected. Herein, the term "friend" may refer to any other user of social-networking system 860 with whom a user has formed a connection, association, or relationship via social-networking system 860.

In particular embodiments, social-networking system 860 may provide users with the ability to take actions on various types of items or objects, supported by social-networking system 860. As an example and not by way of limitation, the items and objects may include groups or social networks to which users of social-networking system 860 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 860 or by an external system of third-party system 870, which is separate from social-networking system 860 and coupled to social-networking system 860 via a network 810.

In particular embodiments, social-networking system 860 may be capable of linking a variety of entities. As an example and not by way of limitation, social-networking system 860 may enable users to interact with each other as well as receive content from third-party systems 870 or other entities, or to allow users to interact with these entities through an application programming interfaces (API) or other communication channels.

In particular embodiments, a third-party system 870 may include one or more types of servers, one or more data stores, one or more interfaces, including but not limited to APIs, one or more web services, one or more content sources, one or more networks, or any other suitable components, e.g., that servers may communicate with. A third-party system 870 may be operated by a different entity from an entity operating social-networking system 860. In particular embodiments, however, social-networking system 860 and third-party systems 870 may operate in conjunction with each other to provide social-networking services to users of social-networking system 860 or third-party systems 870. In this sense, social-networking system 860 may provide a platform, or backbone, which other systems, such as third-party systems 870, may use to provide social-networking services and functionality to users across the Internet.

In particular embodiments, a third-party system 870 may include a third-party content object provider. A third-party content object provider may include one or more sources of content objects, which may be communicated to a client system 830. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 860 also includes user-generated content objects, which may enhance a user's interactions with social-networking system 860. User-generated content may include anything a user can add, upload, send, or "post" to social-networking system 860. As an example and not by way of limitation, a user communicates posts to social-networking system 860 from a client system 830. Posts may include data such as status updates or other textual data, location information, photos, videos, links, music or other similar data or media. Content may also be added to social-networking system 860 by a third-party through a "communication channel," such as a newsfeed or stream.

In particular embodiments, social-networking system 860 may include a variety of servers, sub-systems, programs, modules, logs, and data stores. In particular embodiments, social-networking system 860 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 860 may also include suitable components such as network interfaces, security mechanisms, load balancers, failover servers, management-and-network-operations consoles, other suitable components, or any suitable combination thereof. In particular embodiments, social-networking system 860 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 860 to one or more client systems 830 or one or more third-party system 870 via network 810. The web server may include a mail server or other messaging functionality for receiving and routing messages between social-networking system 860 and one or more client systems 830. An API-request server may allow a third-party system 870 to access information from social-networking system 860 by calling one or more APIs. An action logger may be used to receive communications from a web server about a user's actions on or off social-networking system 860. In conjunction with the action log, a third-party-content-object log may be maintained of user exposures to third-party-content objects. A notification controller may provide information regarding content objects to a client system 830. Information may be pushed to a client system 830 as notifications, or information may be pulled from client system 830 responsive to a request received from client system 830. Authorization servers may be used to enforce one or more privacy settings of the users of social-networking system 860. A privacy setting of a user determines how particular information associated with a user can be shared. The authorization server may allow users to opt in to or opt out of having their actions logged by social-networking system 860 or shared with other systems (e.g., third-party system 870), such as, for example, by setting appropriate privacy settings. Third-party-content-object stores may be used to store content objects received from third parties, such as a third-party system 870. Location stores may be used for storing location information received from client systems 830 associated with users. Advertisement-pricing modules may combine social information, the current time, location information, or other suitable information to provide relevant advertisements, in the form of notifications, to a user.

Figure 9:
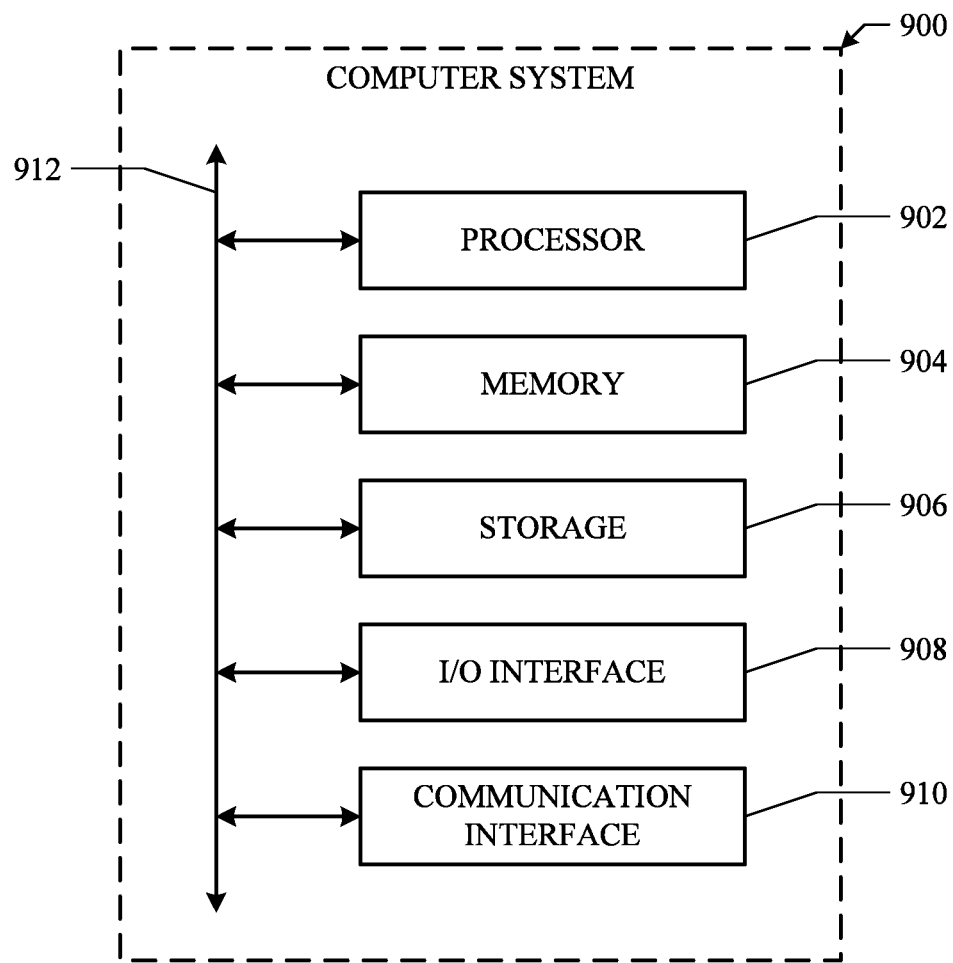
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   rendering, for one or more displays of a VR display device, a first output image of a VR environment based on a field of view of a first user;
   detecting a trigger, wherein the trigger is generated based on a second user approaching within a threshold distance of the first user and outside the field of view of the first user; and
   rendering, responsive to the detected trigger, for the one or more displays of the VR display device, a second output image comprising a directional warning, wherein the directional warning indicates a direction of movement of the second user relative to the first user, and
   wherein the threshold distance for the trigger is determined based on a type of the VR environment, of multiple types of VR environments, each of the multiple types of VR environments being defined by a different amount of movement, in a real-world environment, required a respective VR environment.

2. The method of claim 1, wherein detecting the trigger comprises:
   determining a proximity of the second user relative to the first user.

3. The method of claim 1, wherein determining detecting the trigger comprises:
   determining the direction of movement of the second user relative to the first user.

4. The method of claim 1, wherein the directional warning comprises a colored band overlaid on the one or more displays of the VR display device.

5. The method of claim 1, wherein the directional warning comprises a passthrough view of a real-world environment.

6. The method of claim 1, wherein an intensity of the directional warning is inversely proportional to a distance of the second user to the first user.

7. The method of claim 1, wherein an intensity of the directional warning is proportional to a speed of movement of the second user approaching the first user.

8. The method of claim 1, wherein an intensity of the directional warning is further based on the type of the VR environment.

9. The method of claim 1, further comprising:
   rendering the second user as a VR avatar in the VR environment when the second user is within the field of view of the first user.

10. The method of claim 1, wherein the directional warning is rendered on or near an edge of the one or more displays of the VR display device corresponding to the direction of movement of the second user relative to the first user.

11. The method of claim 1, wherein the directional warning comprises a visual cue.

12. The method of claim 1, wherein the directional warning comprises an audio cue.

13. The method of claim 1, wherein the directional warning comprises a haptic cue.

14. A system comprising: one or more processors; and
one or more computer-readable non-transitory storage media coupled to one or more of the processors and comprising instructions operable when executed by one or more of the processors to cause the system to:
render, for one or more displays of a VR display device, a first output image of a VR environment based on a field of view of a first user;
detect a trigger, wherein the trigger is generated based on a second user approaching within a threshold distance of the first user and outside the field of view of the first user; and
render, responsive to the detected trigger, for the one or more displays of the VR display device, a second output image comprising a directional warning, wherein the directional warnings indicates a direction of movement of the second user relative to the first user, and
wherein the threshold distance for the trigger is determined based on a type of the VR environment, of multiple types of VR environments, each of the multiple types of VR environments being defined by a different amount of movement, in a real-world environment, required a respective VR environment.

15. The system of claim 14, wherein detecting the trigger comprises:
determining a proximity of the second user relative to the first user.

16. The system of claim 14, wherein detecting the trigger comprises:
determining the direction of movement of the second user relative to the first user.

17. The system of claim 14, wherein the directional warning comprises a colored band overlaid on the one or more displays of the VR display device.

18. The system of claim 14, wherein the directional warning comprises a passthrough view of a real-world environment.

19. The system of claim 14, wherein an intensity of the directional warning is inversely proportional to a distance of the second user to the first user.

20. One or more computer-readable non-transitory storage media embodying software that is operable when executed to:
render, for one or more displays of a VR display device, a first output image of a VR environment based on a field of view of a first user;
detect a trigger, wherein the trigger is generated based on a second user approaching within a threshold distance of the first user and outside the field of view of the first user; and
render, responsive to the detected trigger, for the one or more displays of the VR display device, a second output image comprising a directional warning, wherein the directional warnings indicates a direction of movement of the second user relative to the first user, and
wherein the threshold distance for the trigger is determined based on a type of the VR environment, of multiple types of VR environments, each of the multiple types of VR environments being defined by a different amount of movement, in a real-world environment, required a respective VR environment.

* * * * *